Aug. 30, 1932.  S. F. HUFNAGEL ET AL  1,874,534
SWILLER
Filed Oct. 15, 1931   2 Sheets-Sheet 1
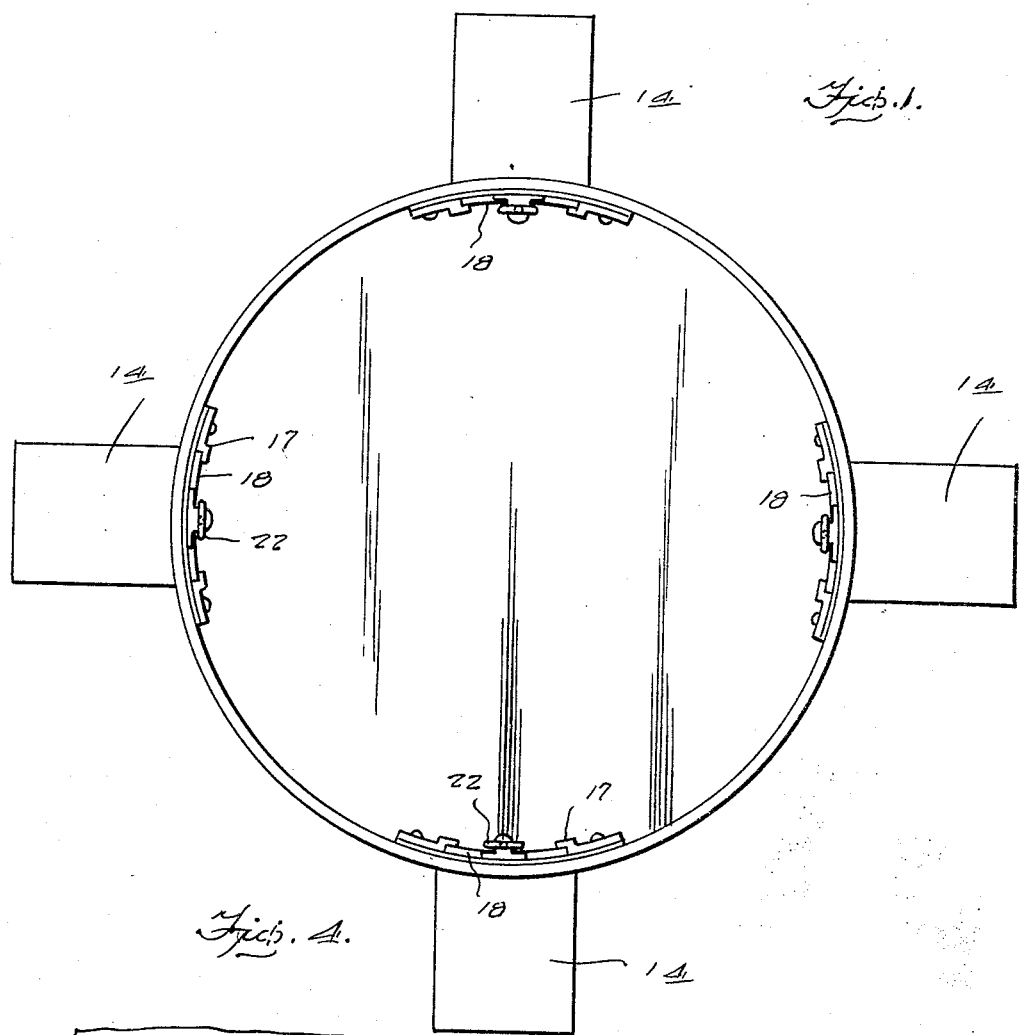
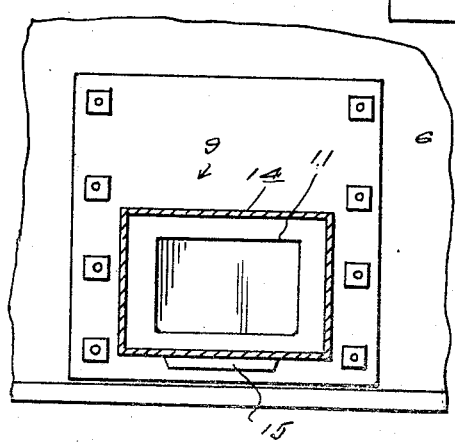
Inventors
S. F. Hufnagel
Charles Hufnagel
Alvena Hufnagel
George Hufnagel
By
Attorney Aug. 30, 1932. S. F. HUFNAGEL ET AL 1,874,534
SWILLER
Filed Oct. 15, 1931  2 Sheets-Sheet 2
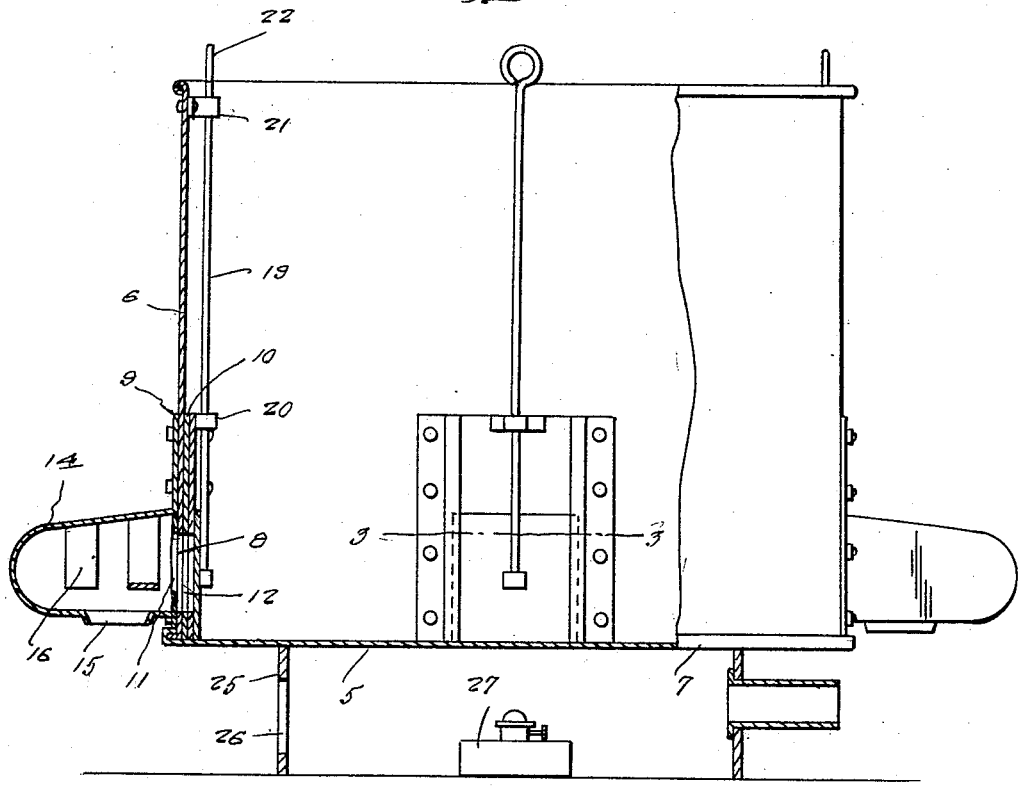
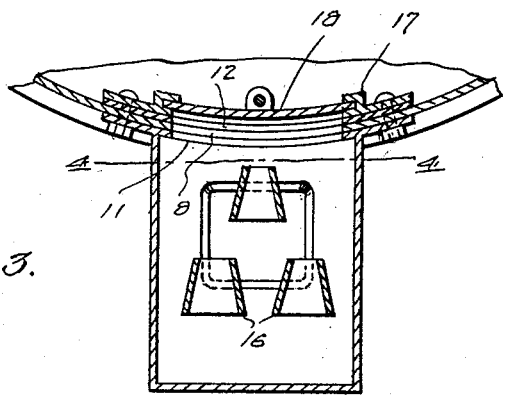
Inventors
S. F. Hufnagel
Charles Hufnagel
Alvena Hufnagel
George Hufnagel
By Clarence A. O'Brien
Attorney Patented Aug. 30, 1932

1,874,534

UNITED STATES PATENT OFFICE

SIMON F. HUFNAGEL, CHARLES HUFNAGEL, ALVENA HUFNAGEL, AND GEORGE HUFNAGEL, OF PLATTE TOWNSHIP, TAYLOR COUNTY, IOWA

SWILLER

Application filed October 15, 1931. Serial No. 569,066.

The present invention relates to a hog swiller and has for its prime object to provide means for expeditiously feeding a large number of hogs in a relatively short time.

Another very important object of the invention resides in the provision of a device of this nature which mixes the feed and distributes it into troughs and the like by one operation.

Another very important object of the invention resides in the provision of a hog swiller of this nature which is simple in its construction, inexpensive to manufacture, strong and durable, easy to manipulate, and thoroughly efficient and reliable in use.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the device embodying the features of our invention.

Figure 2 is a sectional elevation thereof.

Figure 3 is a horizontal section taken substantially on the line 3—3 of Figure 2, and Figure 4 is a vertical section taken substantially on the line 4—4 of Figure 3.

Referring to the drawings in detail it will be seen that a tank is composed of a bottom 5 with a cylindrical wall 6 rising therefrom and attached thereto by suitable seam connection 7. The lower portion of the cylindrical wall 6 is formed with a plurality of rectangular openings 8. Plates 9 are secured to the outside of the wall 6 and plate 10 secured to the inside of the wall 6 and are provided with rectangular openings 11 and 12 respectively registering with openings 8. Spouts 14 are placed on the plates 9 and project outwardly therefrom and have openings 15 in their bottom and a plurality of mixing loops 16 are arranged in the spouts above the openings. These loops are arranged preferably as shown in Figure 3.

It will be noted that the width of the loops adjacent the tank is smaller than the width remote from the tank.

A pair of cleats 17 are arranged vertically on each plate 10 one to each side of the opening 12 therein and slidably receive valve plate 18 to which is attached a rod 19 slidable through guides 20 and 21 and terminating at its upper end in an eye 22 so that by raising the rod the valve may be open.

The tank is preferably rested on a cylindrical port 25 having openings 26 and a lamp or other heating means 27 may be disposed in the supporting structure under the bottom 5 to heat the tank when necessary to prevent freezing.

This hog swiller permits the mixing of the feed and distributes it in troughs and the like under the spouts 14. The swill as is used for feeding hogs is usually a combination of ground feed, yeast and water—the feed being soaked several hours before being used. One of the special merits of our device is the thoroughness with which it mixes the combination.

It is thought that the construction, utility and advantages of this invention will now be clearly understood by those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. A device of the class described including a tank formed with a bottom and a cylindrical side wall rising therefrom, said wall being formed with an opening adjacent the bottom, a plate on the outside of the wall and a second plate on the inside of the wall, said plates having openings registering with the first mentioned openings, cleats mounted on the second plate, a valve plate slidable in the cleats, a spout formed on the first mentioned plate and projecting outwardly in communication with the openings and formed with an opening in its bottom, a plurality of mixing loops suspended from the top of the spout above the opening in the bottom thereof.

2. A device of the class described including a tank formed with a bottom and a cylindrical side wall rising therefrom, said wall being formed with an opening adjacent the bottom, a plate on the outside of the wall and a second plate on the inside of the wall, said plates having openings registering with the first mentioned openings, cleats mounted on the second plate, a valve plate slidable in the cleats, a spout formed on the first mentioned plate and projecting outwardly in communication with the openings and formed with an opening in its bottom, a plurality of mixing loops suspended from the top of the spout above the opening in the bottom thereof, said loops having widths narrower adjacent the tank than widths remote therefrom.

3. In a swiller of the class described, a tank, a spout projecting from the tank in communication therewith, said spout having an opening in its bottom, a plurality of mixing loops suspended from the top of the spout above the opening in the bottom thereof, said loops having widths narrower adjacent the tank than widths remote therefrom.

In testimony whereof we affix our signatures.

SIMON F. HUFNAGEL.
CHARLES HUFNAGEL.
ALVENA HUFNAGEL.
GEORGE HUFNAGEL.